United States Patent
Reddig et al.

(10) Patent No.: US 6,955,394 B1
(45) Date of Patent: Oct. 18, 2005

(54) STRUCTURAL COMPONENT FOR A MOTOR VEHICLE

(75) Inventors: Thomas Reddig, Bietigheim-Bissingen (DE); Walter Wolf, Oppenweiler-Zell (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/111,800

(22) PCT Filed: Oct. 27, 2000

(86) PCT No.: PCT/EP00/10599

§ 371 (c)(1),
(2), (4) Date: Apr. 29, 2002

(87) PCT Pub. No.: WO01/54964

PCT Pub. Date: Aug. 2, 2001

(30) Foreign Application Priority Data

Jan. 27, 2000 (DE) ................................ 100 03 575

(51) Int. Cl.[7] ............................................ B62D 25/08
(52) U.S. Cl. .................... 296/208; 296/193.02; 296/72
(58) Field of Search ........................... 296/194, 203.02, 296/208, 70, 72, 193.08, 193.02

(56) References Cited

U.S. PATENT DOCUMENTS

| | | | | |
|---|---|---|---|---|
| 4,365,826 A | * | 12/1982 | Iriyama | ...................... 280/779 |
| 4,391,465 A | * | 7/1983 | Piano | ......................... 296/208 |
| 5,354,114 A | | 10/1994 | Gray et al. | |
| 5,358,300 A | * | 10/1994 | Gray | .......................... 296/192 |
| 5,967,598 A | * | 10/1999 | Eilemann et al. | ........... 296/208 |
| 6,186,887 B1 | | 2/2001 | Dauvergne | |
| 6,276,739 B1 | | 8/2001 | Wich | |
| 6,502,897 B2 | * | 1/2003 | Neuss et al. | ................. 296/208 |

FOREIGN PATENT DOCUMENTS

| | | |
|---|---|---|
| DE | 197 53 877 | 6/1998 |
| DE | 197 20 902 | 11/1998 |
| DE | 299 16 470 | 12/1999 |
| DE | 29916470 U1 * | 1/2000 |
| EP | 0 370 342 | 5/1990 |
| EP | 0 982 087 | 3/2000 |
| EP | 0 995 668 | 4/2000 |
| FR | 2 789 043 | 8/2000 |
| WO | WO 00/56517 | 9/2000 |

* cited by examiner

Primary Examiner—Dennis H. Pedder
(74) Attorney, Agent, or Firm—Foley & Lardner LLP

(57) ABSTRACT

The invention relates to a structural component for a motor vehicle, especially a stretcher to be used in the driver's compartment. The structural component (10) is configured as a lightweight component that comprises a shell-shaped base (12) and plastic reinforcement ribs (20, 26) molded onto said base. The aim of the invention is to provide an improved structural component that has the advantages of a lightweight component while being capable of fulfilling other functions in addition to its structural function. To this end, at least one channel (16) is completely or partially injection-molded into the interior (14) of the base (12) along with the reinforcement ribs (20).

22 Claims, 8 Drawing Sheets

STRUCTURAL COMPONENT FOR A MOTOR VEHICLE

The invention relates to a component for a motor vehicle, in particular a cross member for the cockpit region, in accordance with the preamble of claim 1 and also to a method for producing the component and to uses of this component.

Cross members comprising pipes and consisting of metal, for sufficient resistance to bending, buckling and torsion, and hence sufficient pressure load-bearing capacity, and having appropriately large wall thicknesses are known from the motor vehicle industry. Said cross members result in a high weight and disadvantages in terms of costs. The pipes can in principle be used for guiding air, for example from an air conditioning system arranged centrally in the vehicle to lateral discharging means (see, for example DE 197 53 877), this not being made use of to date, since undesirable condensation water can easily be deposited on the metal pipes.

Furthermore, cross members are known which are of two-shell construction with webs welded into it for stabilization purposes. A cross member of this type is disclosed, for example, in DE 197 20 902. Cross members of this type are very expensive to produce and have a high weight. Guiding of air is not possible.

EP 0 370 342 discloses a lightweight component which can be used as support in the motor vehicle and has a shell-shaped base body which preferably consists of metal and in whose interior reinforcing ribs are arranged. The reinforcing ribs consist of injected plastic and are connected to the metal base body at discrete connecting points by the plastic penetrating apertures arranged in the metal part and extending beyond the surfaces of the apertures. The metal base body is of U-shaped design and the reinforcing ribs penetrate the interior of the base body in order to obtain great stiffness and strength. This known lightweight component, which is designed in what is referred to as a hybrid construction, has an advantageously low weight while at the same time having sufficient strength, stiffness and load-bearing capacity. Guiding of air by means of this lightweight component which can be used as a support is not possible.

Based on this prior art, it is the object of the invention to provide an improved component which on the one hand has the advantages of a lightweight component and yet in addition to a supporting function can fulfill yet further functions. A further object is the providing of a process for producing this component and of uses of the component.

This object is achieved by an article having the features of claim 1 and by a method having the features of claim 9.

According to an aspect of the present invention, there has been provided, a component for a motor vehicle, in particular a cross member for the cockpit region, the component (10) being designed as a lightweight component having a shell-shaped base body (12) and having reinforcing ribs (20) consisting of injection-molded plastic, characterized in that together with the reinforcing ribs (20) at least one duct (16) is injected entirely or partially in the (14) interior of the base body.

According to another aspect of the present invention, there has been provided, a method for producing a component for a motor vehicle, in particular a cross member for the cockpit region, characterized by the following method steps: production of the base body (12); insertion of the base body (12) into an injection molding die; injection molding of the plastic parts, namely the at least one duct (16, 28), the reinforcing ribs (20, 26) and, if provided, the at least one inlet connection and/or outlet connection (30, 32, 35, 36); removal of the component (10) together with the injection molded plastic parts from the die; insertion of at least one closure element (44, 46) into the at least one end (40*a*, 41) of the air guiding duct (16, 28).

According to one embodiment of the present invention, there has been provided a component for a motor vehicle, in particular a cross member for the cockpit region comprising a duct, wherein the duct forms a container for a medium, such as washing water for headlights or the windshield, cooling water, oil, compressed air or the like or forms a duct for the protected laying of a gasoline line, oil line, compressed-air lines or the like.

Although it is possible in principle for the duct to extend in any desired direction independently of the base body, it is, however, preferable for the duct to extend in the longitudinal direction of the component, so that the component can be used in optimum fashion for accommodating the duct.

An inlet connection and an outlet connection can be provided in each case at the ends of the duct and can be guided laterally out of the component, so that the component can be fastened by its ends, for example between the A-pillars of the vehicle.

When the component is used as a dashboard support, the duct is advantageously designed as an air-guiding duct, and a second air-guiding duct is provided so that air can be guided from an air conditioning system, which is arranged centrally for example, to lateral discharging means. The ducts are then arranged approximately symmetrically with respect to one another and their inlet connections are situated approximately in the central region of the component and their outlet connections are situated in the end regions of the component.

Instead of two inlet connections for the two ducts, in one refinement a common inlet connection for both ducts could be provided.

In order to enable the component to be readily removed from an injection molding die, the duct tapers slightly in cross section from one end to the other.

In one refinement of the invention, the base body is of U-shaped design in cross section, with U-limbs and a base, the base preferably being of curved design, for example semicircular. The injected air-guiding duct can then be of approximately round design in cross section in a streamlined manner without undercuts which would make removal from the die more difficult being produced.

In a preferred refinement of the invention, as seen in cross section, a subregion of the base body forms part of the wall of the duct. There is therefore no clearance between the duct and the base body which would make the production in the injection molding process more difficult.

In order to increase the stability and in order to obtain connection points for vehicle components, such as the steering column etc., the reinforcing ribs are not only arranged in a known manner in the interior, but also outside the interior.

The invention will be explained in detail below using exemplary embodiments and with reference to the drawing, in which.

Figure 1:
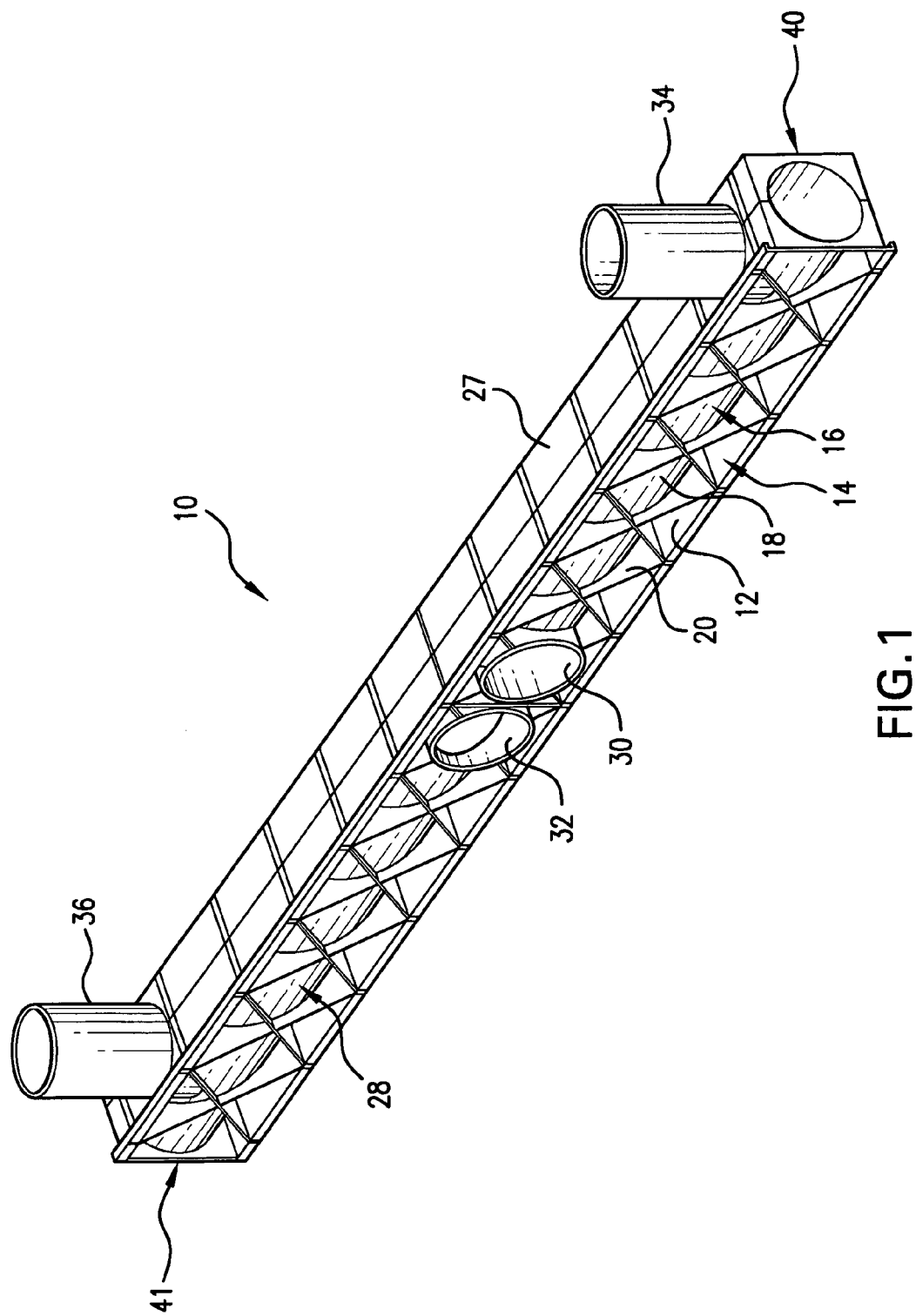
FIGS. 1 and 2 show perspective views of a component according to the invention.
Figure 7:
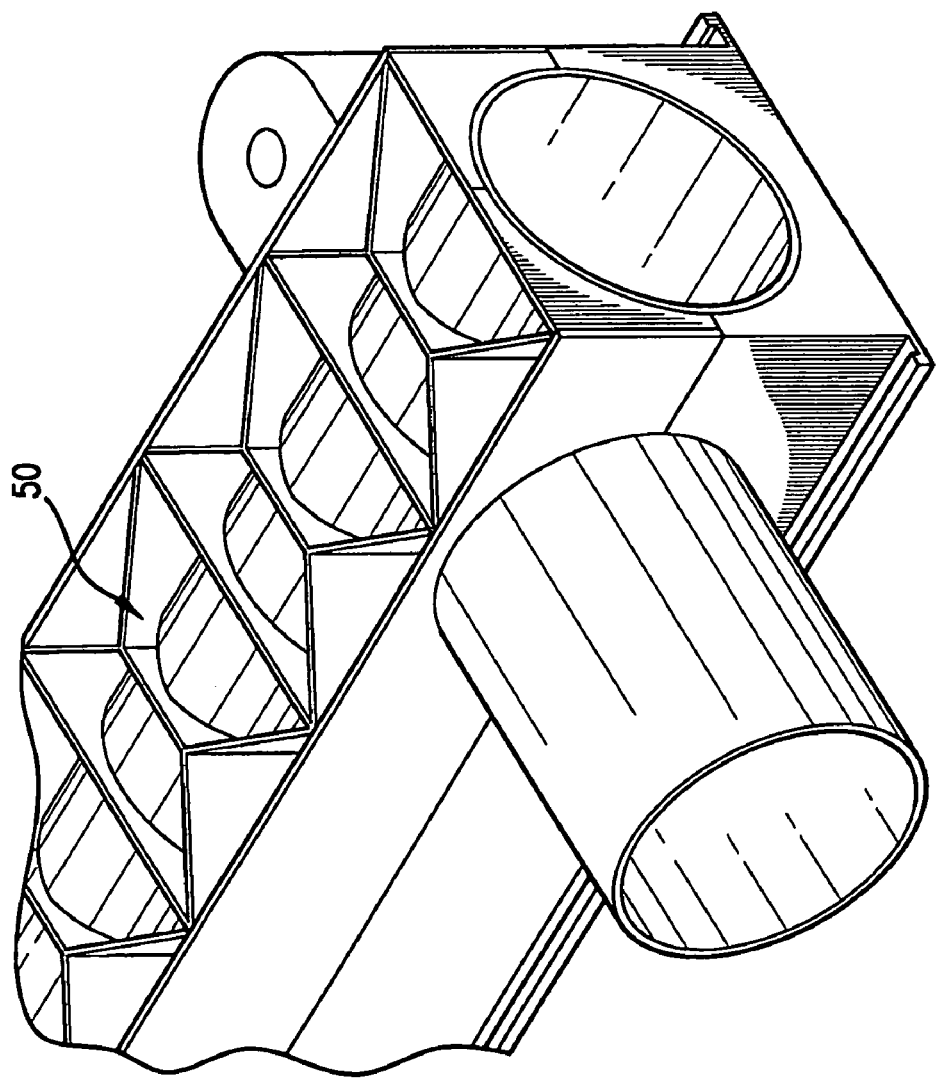
FIG. 7 shows a detailed view of one end of the component according to another embodiment of the present invention.

A component 10 according to the invention has a shell-shaped base body 12 which preferably consists of metal. At least one duct 16 is arranged in the interior 14 of the base body 12, said duct preferably extending in the longitudinal direction of the component 10. Reinforcing ribs 20 are arranged in the interior 14, between a wall 18 of the duct 16 and the base body 12. A clearance which is configured to be trapezoidal 50 (see FIG. 7), triangular 52 (see FIG. 3), diamond-shaped or the like is left between the individual reinforcing ribs 20. In the exemplary embodiment illustrated, the reinforcing ribs 20 form a diamond-like pattern (FIG. 1). The duct 16 and the reinforcing ribs 20 consist of plastic and are produced as a single piece by injection molding.

Figure 5:
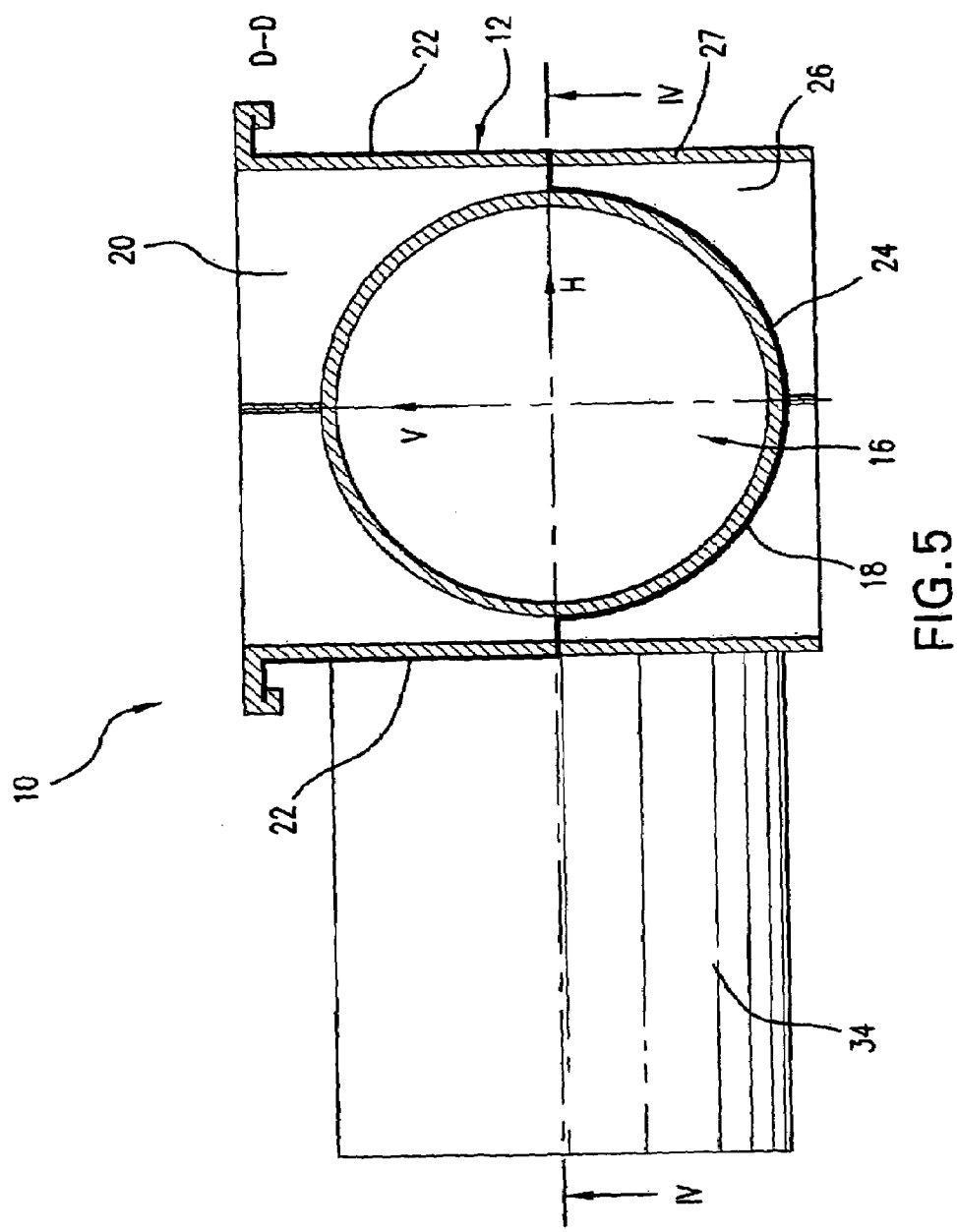
FIG. 5 shows a cross section along the line V—V from FIG. 4.

The base body 12 is preferably of U-shaped design in cross section with U-limbs 22 and a base 24, the base 24 preferably being of approximately arc-shaped design (FIG. 5). As illustrated in FIG. 5, the base 24 forms part of the wall 18 of the duct 16. In the region of the base 24, the duct 16 is of double-walled design. The base body 12 is covered here by the plastic forming the wall 18. In principle, it would also be possible for the base 24 to directly form the wall 18, as is described further below with reference to the exemplary embodiments from FIGS. 6a, 6b, 6c. If, however, the base body consists of metal and the duct is used as an air-guiding duct, there is the risk of undesirable condensation water easily forming on the metal.

Figure 2:
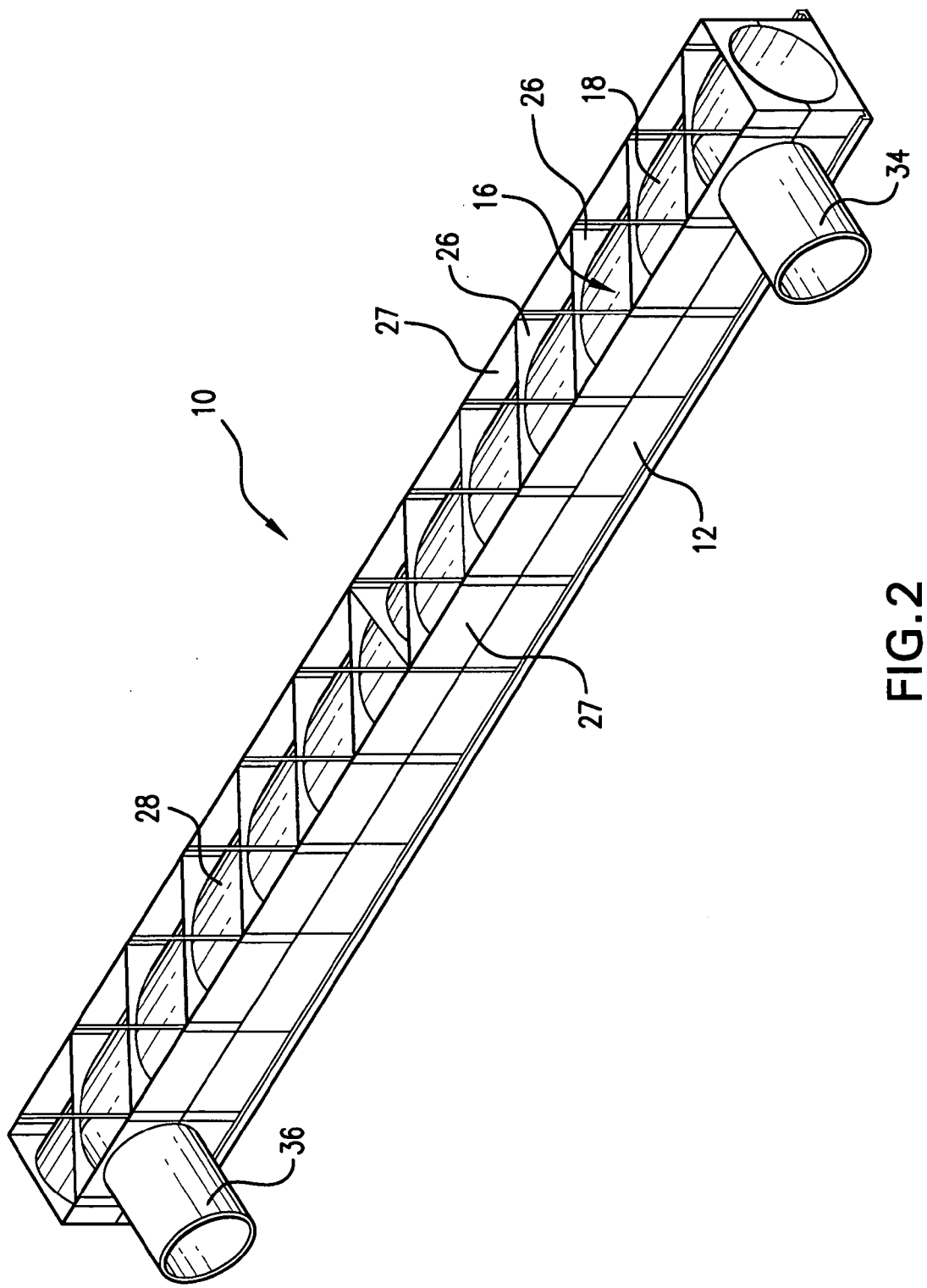
Figure 3:
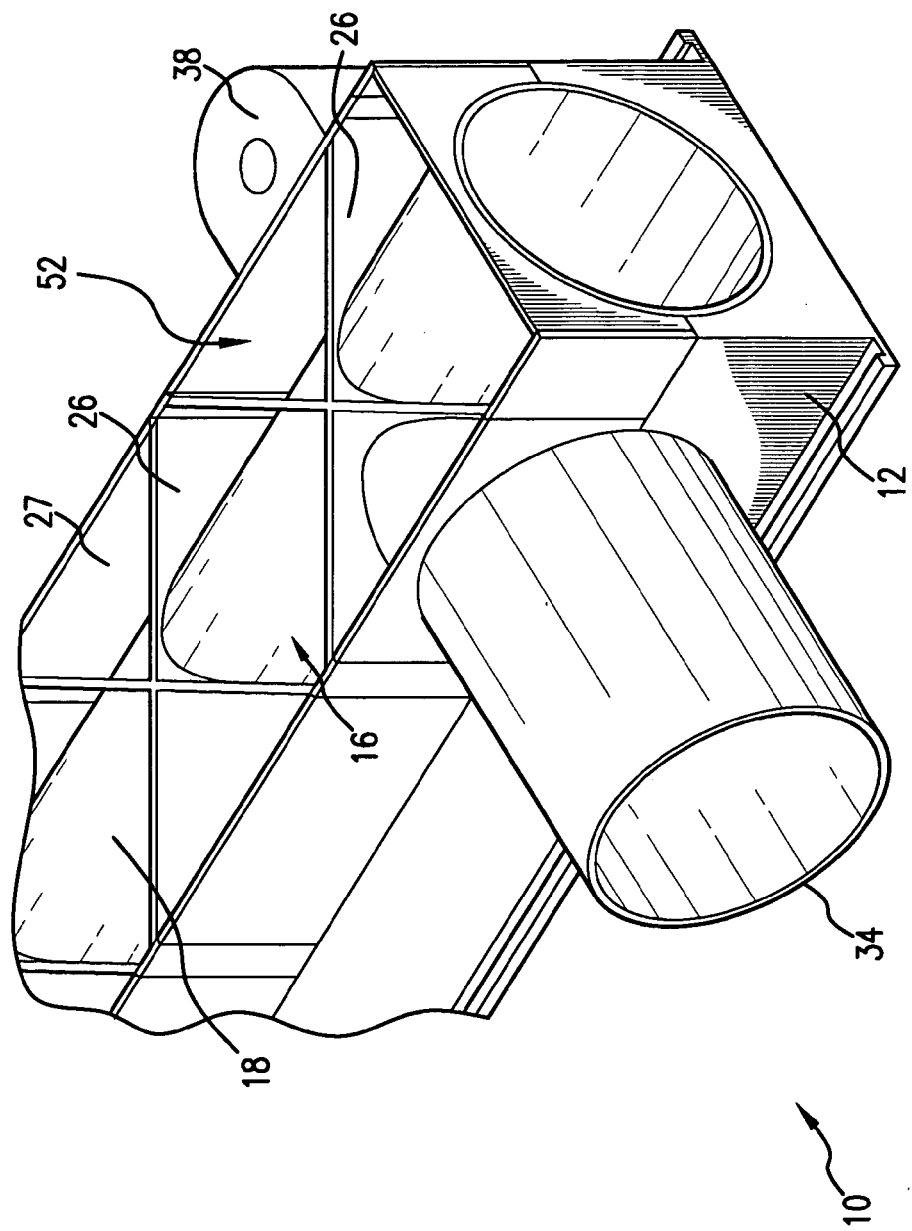
FIG. 3 shows a detailed view of one end of the component.

In order to increase the stability of the component 10, further reinforcing ribs 26 are also arranged outside the interior, in particular in the region of the base 24, as is shown in particular in FIGS. 2 and 3. Like the first reinforcing ribs 20, the second reinforcing ribs 26 form a diamond-like pattern, webs 27 additionally being provided on the edges of the component 10, said webs likewise consisting of plastic and being injection molded together with the reinforcing ribs 26. Fastening tabs 38 or the like, which are only illustrated in FIG. 3 by way of example, can be arranged on the webs 27.

The component 10 is preferably used as cross member in the cockpit region, and so in the following description of one of many possible exemplary embodiments the component 10 is referred to as a cross member.

Next to the duct 16 in the cross member 10 there is preferably arranged a further duct 28 approximately symmetrically with respect to the first duct 16. The ducts 16 and 28 respectively have an inlet connection 30 or 32 and an outlet connection 34 or 36. Inlet connections and outlet connections 30, 32, 34, 36 are in each case guided laterally out of the cross member 10. Depending on the intended use, the connections can also be guided out of one of the four sides of the cross member 10. The inlet connections 30 and 32 are situated approximately in the center of the cross member 10 and the outlet connections 34 and 36 are situated in the two end regions of the cross member 10. A cross member 10 formed in such a manner can then not only be used for securing the dashboard and further component, such as the steering column, airbag and the like, arranged in the region of the dashboard, but can simultaneously serve for guiding air which has to be guided from a centrally arranged air conditioning system to discharging means which are arranged in the lateral regions of the vehicle interior.

The ducts 16 and 28 together with their inlet connections and outlet connections 30, 32, 34, 36 and the reinforcing ribs 20 and 26 together with the webs 27 are injection molded in a common injection molding process, as will be described in detail below. The plastic parts are connected to one another to the base body 12 at discrete connecting points, as is already known in detail from EP 0 370 342. At the discrete connecting points, the base body 12 has apertures (not illustrated in the drawing) which are penetrated by the plastic and around which the plastic engages.

The cross member 10 according to the invention is produced in the following method steps:

First of all, the base body 12 is produced by one or more of the various metal working techniques, such as rolling, extrusion, folding, punching, perforating, deep-drawing. The base body 12 is then placed into an injection molding die and the ducts 16 and 28 are injection molded together with the reinforcing ribs 20 and 26 and the webs 27. At the same time, the inlet connections and outlet connections 30, 32, 34 and 36 are injection molded. In order to obtain the ducts 16 and 28 and the inlet connections and outlet connections 30, 32, 34, 36, appropriate slides, also called cores, have to be present in the shaping die. The cores for the connections are introduced in the connection direction, and the cores for the ducts are introduced in the longitudinal direction (arrow 42) from the ends 40 and 41 of the cross member 10. After injection of the plastic and molding of the plastic parts, namely the ducts 16 and 28, the inlet connections and outlet connections 30, 32, 34 and 36, the reinforcing ribs 20 and 26 and the webs 27, the cores, among other things, are pulled out again, for the purpose of removal from the mold. In order for this to be possible, the ducts have to taper slightly in cross section from the ends 40 and 41 toward the center of the cross-member, to the inlet connections, with the result that the core and the ducts are of slightly conical design. The change in cross section is so small, the conicity typically being 0.5° to 1°, that it cannot be seen in the drawing. Channels which are of cylindrical design could also be obtained using appropriately and specially designed cores.

Figure 4:
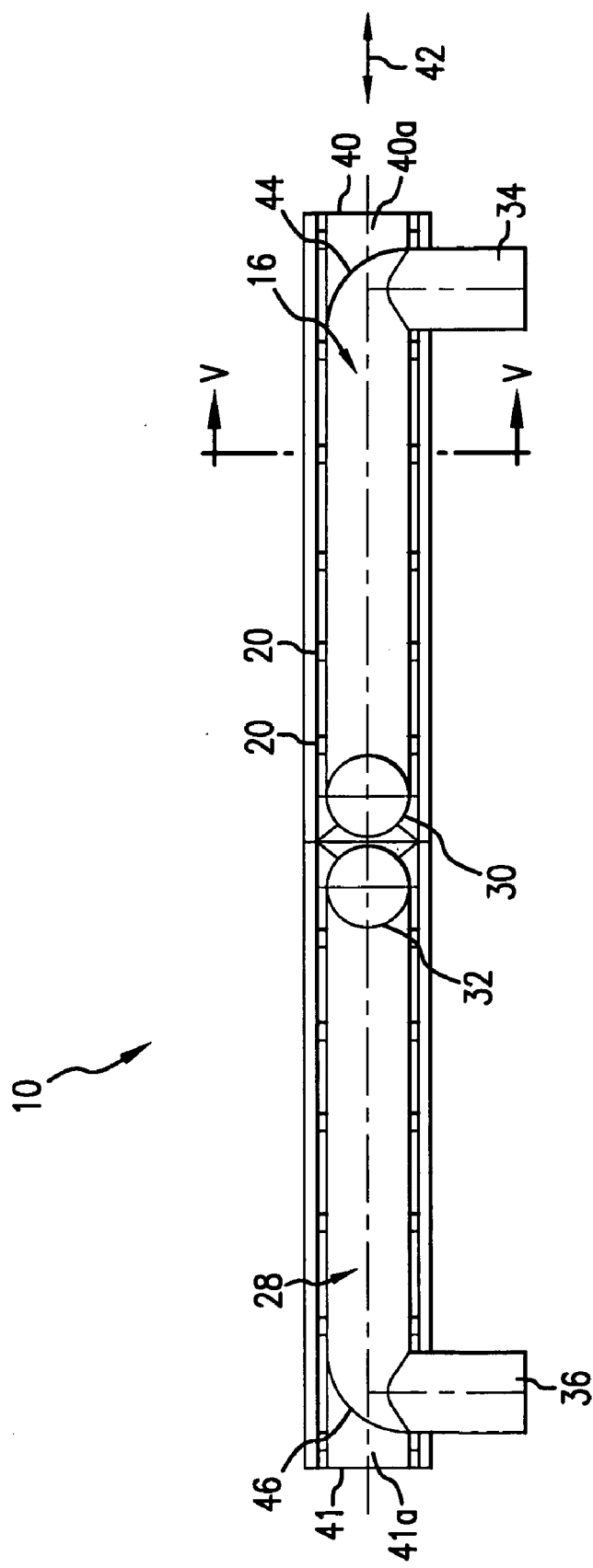
FIG. 4 shows a cross section along the line IV—IV from FIG. 5.

After removal from the mold, the ducts 16 and 28 are then closed, if required, at their ends 40 and 41a by the insertion of closure elements 44 and 46 (FIG. 4). When the ducts 16 and 28 are used for guiding air, the closure elements 44 and 46 are advantageously shaped in a streamlined manner, so that the air to be guided can be guided in a streamlined manner from the corresponding air-guiding duct 16 or 28 into the outlet connection 34, 36.

The cross member 10 can be arranged into a vehicle between the A-pillars. In order to connect the cross member to the A-pillars, fastening elements can be provided which can be inserted into the open ends 40a and 41a of the ducts 16 and 28, which ends project beyond the closure elements 44 and 46, and can be fixed there, if appropriate.

Figure 6A:
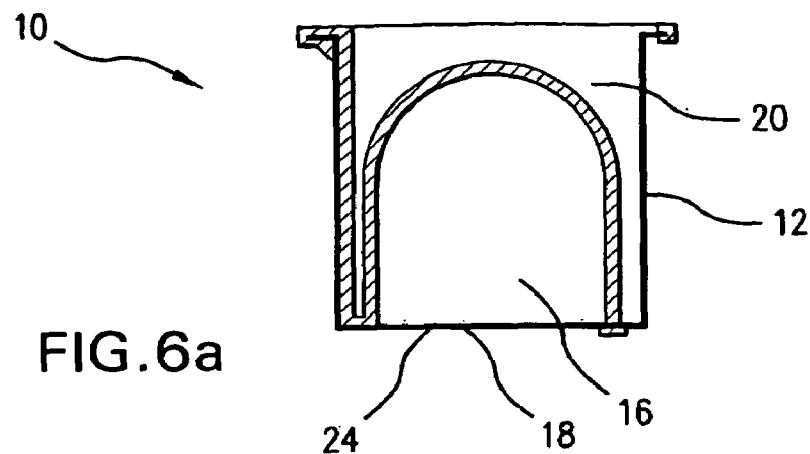
FIGS. 6a, 6b, 6c show further embodiments of the component in cross section.
Figure 6B:
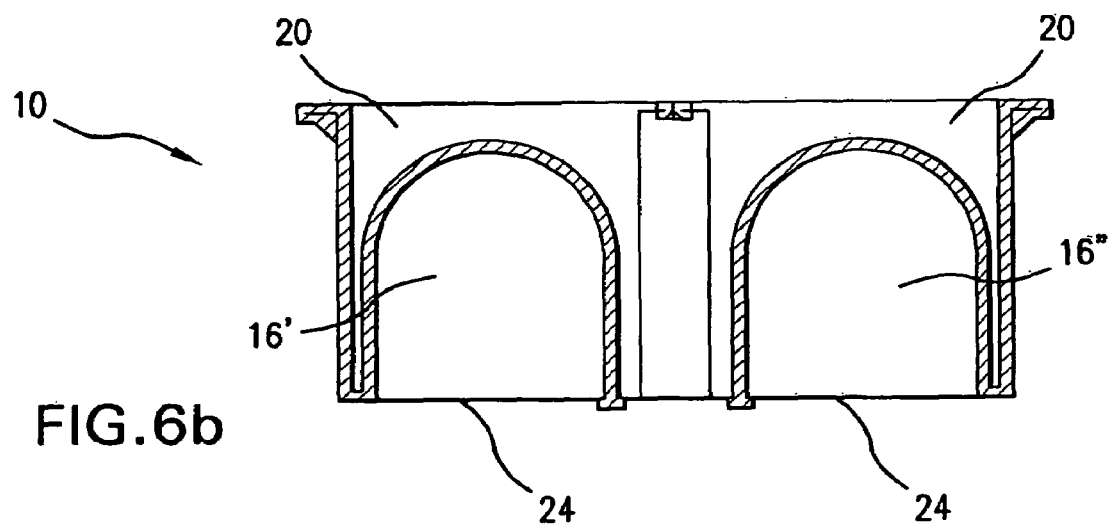
Figure 6C:
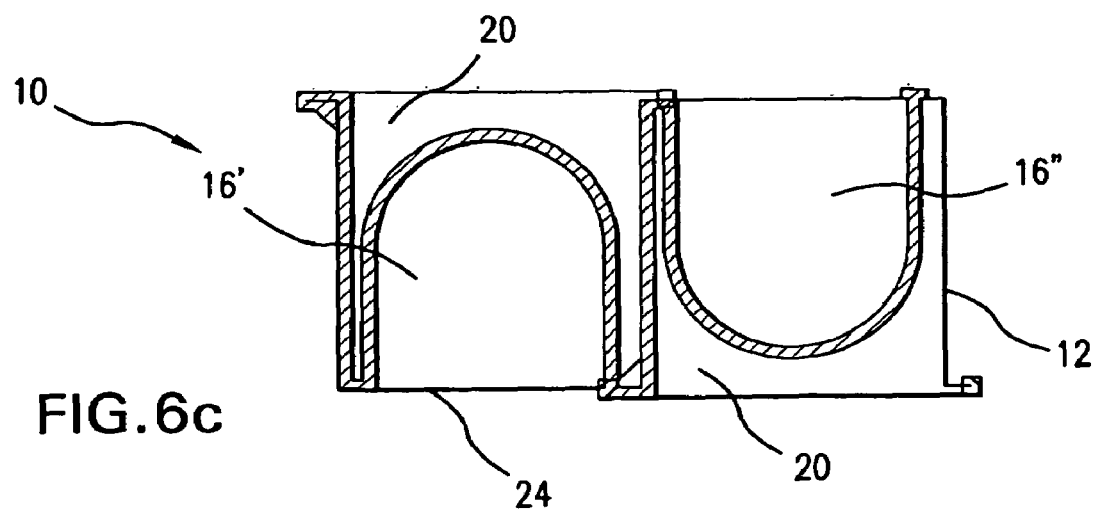

In the further refinement of the invention, the base body 12 and the ducts 16 or 28 can have other shapes in cross section than the shapes illustrated in FIGS. 1 to 5. FIGS. 6a, 6b, 6c show three further exemplary embodiments of a cross member 10 according to the invention. In these figures, the same components of the cross member 10 are referred to by the same reference numbers as in FIGS. 1 to 5.

FIG. 6a illustrates a cross member which has a U-shaped base body 12 and a duct 16 arranged therein, part of the base body 12, namely the base 24 of the cross-sectionally U-shaped base body 12, forming a wall 18 of the duct 16.

The ducts 16 of the cross members 10 according to the exemplary embodiments from FIGS. 6b and 6c are also similarly designed, but here the cross member 10 has two ducts 16' and 16" arranged parallel to each other and the base body 12 of the cross member 10 is of double U-shaped design in cross section and an air duct 16' and 16" is arranged in each U. More than two ducts arranged in parallel in more than two U-shaped subregions of the cross member are conceivable.

In these exemplary embodiments from FIGS. 6a, 6b, 6c, the reinforcing ribs 20 are arranged only in the interior 14 of the cross member 10.

Further refinements of the invention are conceivable.

Thus, instead of the two inlet connections 30 and 32, a common inlet connection through which air enters into the two ducts 16 and 28 can be provided. The entry opening of the common connection or else the openings of the individual inlet connections 30 and 32 can have shapes other than round shapes.

It is also conceivable for the inlet connections and/or outlet connections to be omitted and for the air or other media which are to be guided through the duct to be introduced directly and centrally axially into the duct. This would simplify the shaping die together with its slides.

The duct or ducts could have a plurality of parallel chambers, so that there would be a plurality of subducts. The presence of a plurality of subducts could increase the stability of the component.

It is furthermore conceivable for the component not to be of linear design, as illustrated in the drawing, but to have a plurality of linear subregions which are arranged at an angle with respect to one another. Each of the linear subregions can accommodate a duct.

However, curved components which have a similarly curved duct are also possible. Ducts of this type can be produced, for example, using rotating cores in an injection molding technique.

Figure 8:
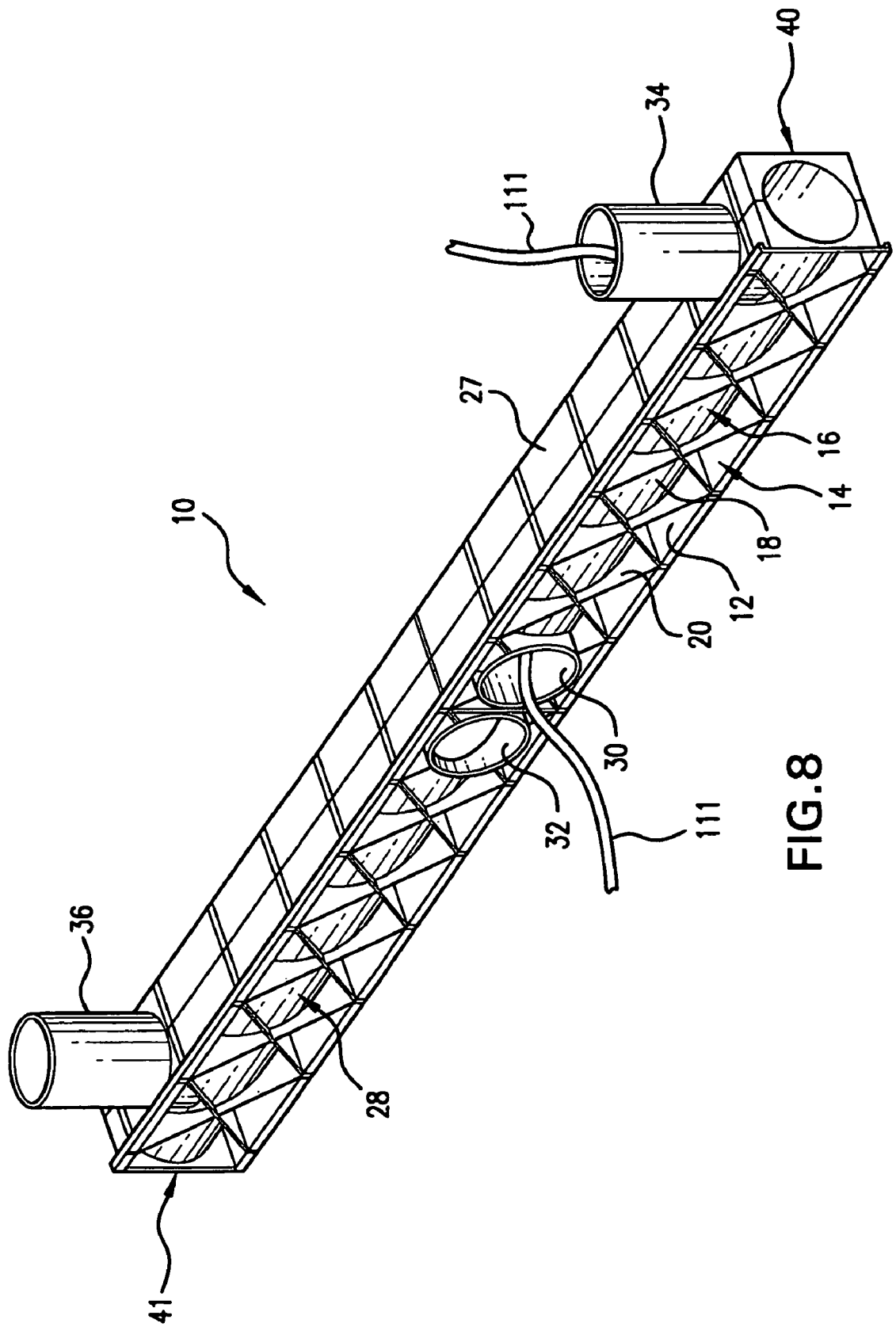
FIG. 8 shows a perspective view of a component according to an embodiment of the present invention when used as a cable duct.

In another embodiment according to the present invention, as is depicted by way of example in FIG. 8, the component includes a duct that may be used as a cable duct for a cable or line 111. In some embodiments, the duct may also be used as an air-guiding duct when used as a cable or line duct. In another embodiment according to the present invention, as also depicted by way of example in FIG. 8, the duct forms a guide for a line 111, for example, for washing water, cooling water or compressed air.

What is claimed is:

1. A cross member for a cockpit region of a motor vehicle comprising:
   (a) a base body comprising a curved base portion and limbs projecting upwardly and outwardly from the base portion;
   (b) reinforcing ribs which comprise injection molded plastic; and
   (c) at least one duct at least partially injected in the interior of the base body;
   wherein the reinforcing ribs are arranged (i) in the interior of the base body between a wall of the duct and the limbs and (ii) in contact with the curved base portion on the exterior of the base body.

2. A cross member according to claim 1, wherein the duct extends in the longitudinal direction of the cross member and, at at least one of its ends, an inlet connection or an outlet connection which is guided laterally out of the component.

3. A cross member according to claim 1, wherein the duct forms a first air-guiding duct.

4. A cross member according to claim 3, further comprising a second air-guiding duct which is arranged approximately symmetrically with respect to the first duct.

5. A cross member according to claim 4, wherein the air-guiding ducts comprise inlet connections which are situated approximately in a central region of the cross member.

6. A cross member according to claim 4, wherein the air-guiding ducts comprise outlet connections which are situated in end regions of the cross member.

7. A cross member according to claim 4, wherein a duct tapers in cross section from one end to the other.

8. A cross member according to claim 1, wherein a subregion of the base body forms part of a wall of the duct.

9. A dashboard support in a motor vehicle comprising a cross member which comprises:
   (a) a base body comprising a curved base portion and limbs projecting upwardly and outwardly from the base portion;
   (b) reinforcing ribs which comprise injection molded plastic; and
   (c) at least one duct at least partially injected in the interior of the base body, wherein the duct comprises at least one of an air-guiding duct and a cable duct;
   wherein the reinforcing ribs are arranged (i) in the interior of the base body between a wall of the duct and the limbs and (ii) in contact with the curved base portion on the exterior of the base body.

10. A motor vehicle comprising a cross member which comprises:
   (a) a base body comprising a curved base portion and limbs projecting upwardly and outwardly from the base portion;
   (b) reinforcing ribs which comprise injection molded plastic; and
   (c) at least one duct at least partially injected in the interior of the base body,
   wherein the cross member is arranged below a windshield and wherein the duct comprises an air-guiding duct for guiding defrosting air to the windshield and/or to the side windows; and
   wherein the reinforcing ribs are arranged (i) in the interior of the base body between a wall of the duct and the limbs and (ii) in contact with the curved base portion on the exterior of the base body.

11. A cross member according to claim 1, wherein the cross member comprises a support in a motor vehicle.

12. A cross member according to claim 11, wherein the cross member is arranged in a front end of the motor vehicle.

13. A cross-member according to claim 11, wherein the duct comprises a cable duct.

14. A cross-member according to claim 11, wherein the duct forms a guide for a line for washing water, cooling water or compressed air.

15. A cross-member according to claim 11, wherein the duct forms a protected path for laying of a gasoline line, an oil line or a compressed-air line.

16. A method for producing a cross member for a cockpit region of a motor vehicle which cross member comprises a shell-shaped base body, reinforcing ribs which comprise injection molded plastic, and at least one duct at least partially injected in the interior of the base body, the method comprising:
   (a) producing a base body;
   (b) inserting the base body into an injection molding die;
   (c) injection molding plastic parts;

(d) removing the cross member together with the injection molded plastic parts from the die; and (e) inserting at least one closure element into at least one end of an air guiding duct.

17. A method according to claim 16, wherein the injection molding further comprises injection molding of at least one duct.

18. A method according to claim 17, wherein the injection molding further comprises injection molding reinforcing ribs.

19. A method according to claim 17, wherein the injection molding comprises injection molding at least one inlet connection or at least one outlet connection.

20. A cross member for a cockpit region of a motor vehicle comprising:
(a) a base body comprising a curved base portion and limbs projecting upwardly and outwardly from the base portion;
(b) reinforcing ribs which are arranged in a substantially trapezoidal, substantially triangular or substantially diamond-shaped configuration; and
(c) at least one duct at least partially injected in the interior of the base body;
wherein the reinforcing ribs are arranged (i) in the interior of the base body between a wall of the duct and the limbs and (ii) in contact with the curved base portion on the exterior of the base body.

21. A motor vehicle comprising a cross member which comprises:
(a) a base body comprising a curved base portion and limbs projecting upwardly and outwardly from the base portion;
(b) reinforcing ribs which comprise injection molded plastic; and
(c) at least one duct at least partially injected in the interior of the base body,
wherein the motor vehicle further comprises A-pillars and wherein the cross member is arranged between the A-pillars; and
wherein the reinforcing ribs are arranged (i) in the interior of the base body between a wall of the duct and the limbs and (ii) in contact with the curved base portion on the exterior of the base body.

22. A motor vehicle comprising a cross member according to claim 21, wherein the motor vehicle further comprises:
a dashboard secured to the cross member; and
an air conditioning system operably linked to the duct such that the duct serves as an air guide for guiding air from the air conditioning system to an interior region of the motor vehicle.

* * * * *